United States Patent [19]

Buckley

[11] 4,003,522
[45] Jan. 18, 1977

[54] COLANDER SYSTEM FOR BAKERY PRODUCTS USE

[76] Inventor: Betty J. Buckley, 662 Linden Ave., York, Pa. 17404

[22] Filed: Dec. 12, 1975

[21] Appl. No.: 640,014

[52] U.S. Cl. .................. 241/95; 209/281; 241/155; 241/169.2; 241/199.9; 241/273.4
[51] Int. Cl.² ........................ B02C 19/08
[58] Field of Search ............ 241/95, 155, 168, 169, 241/169.1, 169.2, 199, 199.9, 199.11, 273.1, 273.2, 273.3, 273.4, 274; 209/234–235, 274, 281, 355

[56] References Cited
UNITED STATES PATENTS

| | | | |
|---|---|---|---|
| 1,517,624 | 12/1924 | Girard et al. | 241/169.1 X |
| 1,752,047 | 3/1930 | Wirt | 241/95 |
| 1,761,067 | 6/1930 | Bjornson | 241/95 |
| 2,222,773 | 11/1940 | Kircher | 241/199.9 X |
| 3,315,807 | 4/1967 | Rosen | 209/355 X |

Primary Examiner—Roy Lake
Assistant Examiner—Howard N. Goldberg
Attorney, Agent, or Firm—C. Hercus Just

[57] ABSTRACT

A colander system comprising a vertical stack of similar colanders respectively having openings of different sizes in at least the lower portions thereof, the uppermost colander having the openings of largest size and the lowermost colander having openings of the smallest size, the uppermost colander being adapted to receive relatively stale bakery products capable of being comminuted when engaged by a pestle member by forcing the products through the openings of the uppermost colander and successively smaller sized particles sifting through the lower colanders progressively for final disposition within a receptacle below the lowermost colander and said colanders having means thereon to maintain the same in stacked relationship, the uppermost colander also having a closure to maintain bakery products in sanitary conditions until the same are to be comminuted.

6 Claims, 5 Drawing Figures

COLANDER SYSTEM FOR BAKERY PRODUCTS USE

BACKGROUND OF THE INVENTION

The problem of disposing of stale bakery products in an economical manner has been a problem confronting housewives for many years. Rather then dispose such stale products in the garbage, economy-minded housewives are inclined to crush the products with a rolling pin but this operation requires preparation of a suitable surface, crushing the products with a conventional rolling pin, and then gathering up the crushed products which usually have scattered somewhat widely and the resulting products being a mixture of pieces of many different sizes. Such a mixture is not particularly suitable for use as conventional bread crumbs and in order to produce useable bread crumbs, it is necessary to extensively roll the material with a rolling pin in an effort to produce a more or less uniform size of relatively fine products. Further, cleaning up the operation at the completion thereof is a somewhat tedious job, with the result that many housewives find it easier to put the stale bread in the garbage.

By use of the present invention, it is possible to comminute stale bakery products such as bread and the like in a sanitary, non-messy manner by the employment of a series of vertically stacked colanders which are described hereinafter. It is recognized that colanders used in culinary operations are old and well known. In general, the commonest type comprise a somewhat hemisphereical or concaved configuration, at least the lower portion of which is perforated, usually with holes of uniform size, and leg members or other supporting means are provided to support the colander so that the open top is disposed substantially horizontally.

Using colanders or similar perforated devices for comminuting or disintegrating food products is old and well known. Examples of typical, somewhat conventional colander are shown in U.S. Pat. Nos. 720,293, to Stocking, dated Feb. 10, 1903, and 1,927,192, to Werner, dated Sept. 17, 1933. An even older U.S. Pat. No. 207,974, to McConnell, dated Sept. 10, 1878, shows a utensil which is sometimes referred to as a "ricer", in which replacable perforated bottom members in a receptacle are inter-changeable for bottom members having different sizes of perforations therein. Further, U.S. Pat. No. 2,150,488, to Camenzind, dated Mar. 14, 1939, shows a cracker crumber in which a somewhat shearing type of apparatus is employed to effect comminution of crackers. The use of a series of sieves in stacked relationship, respectively for classifying different sizes of particles by arranging the coarsest seive uppermost and the finest sieve lowermost also are well known in the mineral industry and also in certain chemical laboratories. Examples of such devices are shown in U.S. Pat. Nos. 1,085,516, to Wilson et al, dated Jan. 27, 1914 and 1,714,208, to Boix, dated May 21, 1929. It is to be noted however that apparatus of this type used in the mineral and chemical industries usually have flat sieves and do not lend themselves to the application of pressure means to force the material through the openings of the sieves.

In the present invention, certain features of prior devices have been combined to produce an efficient and effective apparatus to operate upon stale bakery products and the like for purposes of comminuting the same, details of which are set forth below.

SUMMARY OF THE INVENTION

It is the principal object of the present invention to provide a series of colanders which preferably are of the concaved type, the same being arranged in vertically stacked condition with said colanders respectively having openings of different sizes, the colander with the largest sized openings being uppermost and the lowermost one having openings of the smallest size, whereby stale bread crusts or parts of loaves, rolls, and other normally wasted pieces or parts of bakery products may be initially stored for a limited period in the uppermost colander of the stacked series, which is provided with a sanitary closure member, and perforated side walls of a somewhat cylindrical nature are included in each colander, the side walls extending downward from the open top of each colander, said side walls also having means to maintain the series of colanders in stacked relationship.

It is another object of the invention to provide ventilating openings in said side walls of each colander to permit the passage of air which aids in drying the stored bakery products in particular to enhance the hardening thereof and thereby effect a condition in which the stored bakery products readily may be comminuted by the use of a pestle operated in the uppermost colander to force all particles and pieces of bakery material through the openings thereof and then, if desired, each successive lower colander may be engaged by said pestle until all of the material has been forced through the openings of the lowest colander and is deposited in a receptacle beneath the latter colander.

A further object of the invention is to provide a circumferentially spaced series of leg-like projections depending from the lower edge of each of the side walls of the colanders, said legs not only providing supporting means for the colanders when separated but, in particular with respect to the present invention, said legs serve as aligning means by engaging the upper, outer surface portions of the side walls of the next lower colander to maintain the stacked series thereof in operative relationship with each other.

From the foregoing, it also will be seen that still another object of the invention is to utilize at least the uppermost colander as a convenient storage means for bits and pieces of stale or semi-stale bakery products until the same have been dried sufficiently to permit them readily to be comminuted, and the substantially cylindrical, perforated side wall, in which the openings are very small, prevent the scattering and splattering of small food particles therethrough. Details of the foregoing objects and of the invention, as well as other objects thereof, are set forth in the following specifications and illustrated in the accompanying drawing comprising a part thereof.

DETAILED DESCRIPTION

Figure 1:
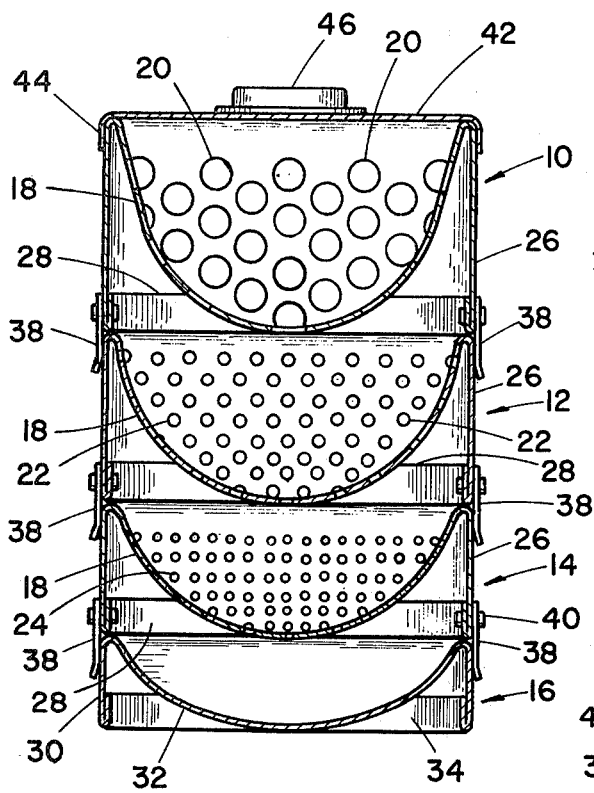
FIG. 1 is a vertical sectioned elevation of a vertical stack of colanders of the type of an arrangement embodying the present invention.

The colander system embodying the principles of the present invention is illustrated in vertical sectioned manner in FIG. 1. In said figure, a series of three colanders 10, 12 and 14 are illustrated in vertically stacked relationship. Beneath the lowermost colander 14, a product receptacle 16 also is illustrated.

Each of the colanders comprises a somewhat hemispherical bowl portion 18, at least the major lower portion of which is provided with perforations. The uppermost colander 10 has perforations 20 which are the largest size, the next lower colander 12 having perforations 22 which are smaller than the perforations 20 in colander 10, while colander 4 has perforations 24 which are the smallest in size of any of the colanders in the system.

Each of the colanders also has a similar preferably cylindrical side wall 26 which depends from the perimeter of the open top of the hemi-spherical bowl portion of each of the colanders, the lower edge of the cylindrical side walls preferably extending downward at least to the level of the lowermost surface of the bowl portion 18 of each colander. Also, for purposes of providing a smooth lower edge on each of the side walls 26, the same is provided with an inturned rim 28. Similarly, the product receptacle 16 has a side wall 30 which preferably is of the same diameter as that of the side walls 26 of the various colanders and the same extends downward from the upper edge of the open rim of the bowl shaped central portions of the receptacle 16. Similarly to the colanders, the lower edge of the side wall 30 of said receptacle has an inturned rim 34 and this forms the supporting surface for the entire stacked system of colanders and receptacle. Particularly from FIGS. 2 and 3, it also will be seen that side walls 26 of each of the colanders also are provided with preferably ornamental patterns of ventilating perforations 36 which are of very small diameter to prevent the ingress of insects but nevertheless provide adequate passage of air to effect drying of the contents of the colanders and also prevent spoilage such as molding.

The colanders 10, 12 and 14, as well as the receptacle 16, may be made from any suitable material such as by stamping, swedging, or molding. Said colanders and receptacles may for example, be made from suitable gauge of sheet steel, aluminum, or molded from appropriate plastic material. Particularly when made from sheet steel, at least the exterior surface thereof, such as the side walls 26, may be appropriately painted and decorated with decals, stencilled, or otherwise. Also, secured to the lower edge portions of the side walls 26 of each of the colanders are a series of circumferentially spaced aligning members 38 which, if desired, may comprise integral depending portions on said side walls or, particularly to minimize the use of material, the members 38 may be stamped from metal or other material of suitable type and secured to the side walls 26 by rivets 40, or other means of suitable nature. The aligning members 38 also, particularly when the colanders are separated, may serve as supporting legs for each individual colander.

Figure 2:
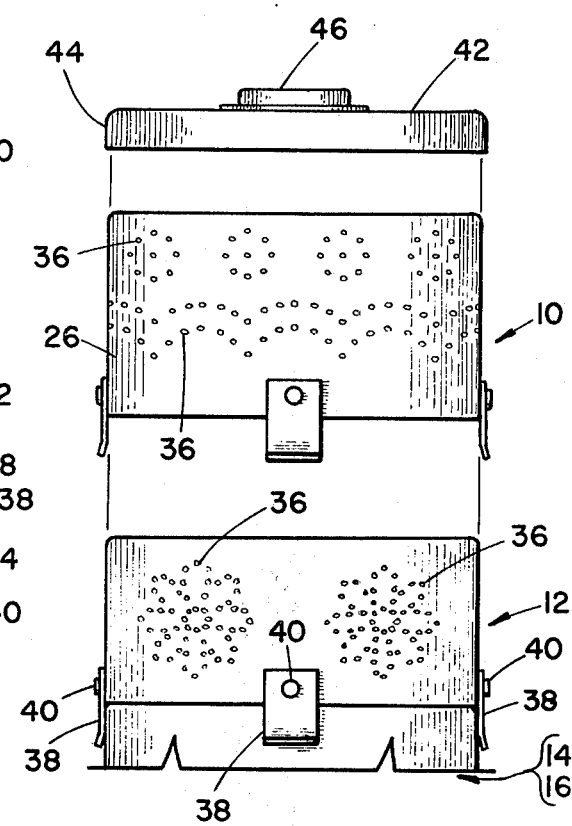
FIG. 2 is a vertically exploded, partially fragmentary elevation of certain of the colanders illustrated in FIG. 1 and showing the same in vertical alignment to illustrate the manner in which the same may be vertically stacked as shown in FIG. 1.
Figure 3:
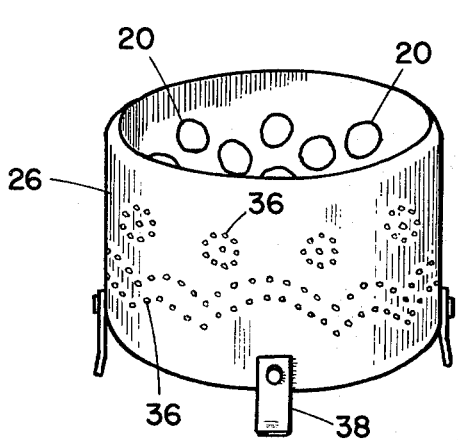
FIG. 3 is a perspective side elevation of the uppermost colander illustrated in FIG. 1 to illustrate details thereof and the possible ornamental arrangement of ventilating openings in the side wall thereof.

For purposes of maintaining the stacked series of colanders and the contents thereof in reasonably sanitary condition, a top closure member 42 of suitable shape, such as that illustrated in FIGS. 1 and 2, is arranged to be readily removable from the upper rim of the open top of the uppermost colander 10, such as by providing a depending flange 44 which slidably engages the outer surface of the side wall 26 of colander 10 at the upper portion thereof. To facilitate handling the closure member 42, an appropriate handle 46 is provided.

Figure 4:
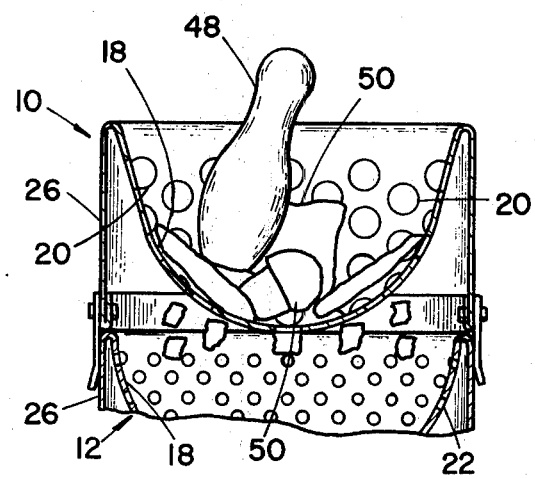
FIG. 4 is an exemplary vertically sectioned view of the operation of the system in accordance with the invention.
Figure 5:
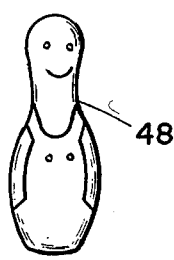
FIG. 5 is a vertical elevation of a typical type of pestle adapted for operation with the colander system comprising the present invention.

Referring to FIGS. 4 and 5, one exemplary form of pestle 48 is shown. It will be seen that appropriate ornamentation may be included on the pestle 48. Said pestle may be formed from appropriate material such as plastic, wood, or otherwise.

OPERATION

Referring to FIG. 4, it will be seen that one suitable plan of operation of the vertical stack of colanders 10, 11 and 12, for example, is to place surplus or stale pieces of bakery products such as bread, rolls, buns, and otherwise, in the upper colander 10 until a reasonable quanity has been accumulated. The closure 42 will maintain the contents of colander 10 in sanitary condition and perforations 36 in the side walls 26 of the various colanders and particularly in uppermost colander 10 will serve to permit the passage of air over and through the contents of colander 10 in order to facilitate drying the same and rendering it reasonably hard and thereby being suitable for comminuting the same by operation of the pestle 48 in an appropriate manner such as by using a wiping or rotary action against the material and thereby force the pieces 50 of bakery product through the apertures 20 of the bowl portion 18 of colander 10. The comminuted material will pass through said openings 20 and fall into colander 12. Such disintegrating operation upon the bakery products 50 to comminute the same will result in pieces of the products much smaller then the diameter of the perforations 20, whereby some of said pieces which are sufficiently small in size will fall through the perforations 22, for example, in colander 12 and, in practice, it has been found that even some smaller pieces will fall from the openings 22 into the lowermost colander 14 and even pass through the openings 24 thereof into the receptacle 32. Under such circumstances however, it will be seen that all of the comminuted material will be retained within one or more of the colanders and the receptacle 32 without being scattered over the working area such as a counter or table.

After all of the material which is capable of being comminuted within the colander 10 has passed through the openings 20 thereof, the uppermost colander 10 then may be removed and the pestle 48 can be used to operate upon the comminuted material which has fallen into the bowl portion 18 of colander 12 in order to further comminute the material to a smaller size by forcing it through the openings 22 so that the same falls into the lowermost colander 14. If still smaller sizes of comminuted material are desired, following the completion of comminuting the material in colander 12, said colander may be removed from colander 14 and the pestle 48 can be employed to further comminute the material by forcing it through the perforations 24 of colander 14 and thereby be collected in the product receptacle 16, access to which is readily obtained by removing the colander 14 therefrom.

From the foregoing, it will be seen that the present colander system provides a sanitary way of economically utilizing excess bakery products which under normal circumstances become stale and are discarded in garbage. By employing the present invention, it is possible to accumulate such pieces under sanitary condition and during a storage period in the uppermost colander for example, ambient air passes through the ventilating perforations in the side walls of the various colanders and especially the uppermost one so as to effect drying of the stored material as well as prevent spoilage thereof such as by the same becoming moldy. Then, when either a need for bread crumbs arises or a sufficient quantity of stored material has accumulated in colander 10, the top closure is removed and the pestle 48 is employed to effect the comminuting operation described hereinabove, ultimately producing bread crumbs of substantially uniform size in the receptacle 32. In the event larger sizes of bread crumbs then produced by the perforations 24 in colander 14 are desired, the lowermost colander 14 may be removed and the colanders 10 and 11 then may be placed directly upon the receptacle 16 in vertically stacked relationship. Still further, if only the large sizes of material are desired such as those produced by colander 10, said colander alone may be used in association with the receptacle 16. Since the storage of bakery products primarily will occur in colander 10 until comminution is to occur, the side walls 26 thereof preferably have a more extensive pattern of ventilating perforations 36 than in the other colanders to facilitate drying of the contents.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A colander system for converting stale bakery products and the like into useful comminuted products, said system comprising in combination a series of colanders of similar diameter and having open tops and concave bottoms having a plurality of openings in at least the normally lower part of each concave bottom, said openings in the different colanders respectively being of different sizes, said colanders having means operable to effect stacking the same one above the other when in use and the colander having the largest openings being uppermost and successive lower colanders each having smaller openings than the one above, a receptacle for comminuted products positioned beneath the lowermost colander in use, and a pestle operable to engage pieces of bakery products in the uppermost colander and comminute said products for passage through the openings in said uppermost colander and successively through the openings in the lower colanders and thereby selectively classify the products as to size or to permit engagement thereof by said pestle as desired when upper colanders are removed to expose the lower colanders.

2. The colander system according to claim 1 in which each colander of the system has a cylindrical sidewall surrounding said concave bottom thereof and depending from the perimeter of the open top of each colander, and said means on said colanders to effect stacking being on said sidewalls of said colanders and respectively engageable with a lower colander to effect said vertically stacked condition.

3. The colander system according to claim 2 in which said cylindrical side walls of each colander is provided with vent openings for the passage of air to enhance drying of the bakery products and prevent spoilage thereof.

4. The colander system according to claim 2 in which said receptacle also is provided with a cylindrical side wall of substantially the same diameter as the side walls upon said colanders of said system.

5. The colander system according to claim 2 in which said means upon said colanders operable to effect stacking thereof comprising a series of leg-like members attached to said cylindrical side walls in circumferentially spaced relationship thereto and depending from the lower edge of said side walls of each colander, said leg-like members being arranged for slidable engagement with the upper portion of the side wall of the next lower colander in said series.

6. The colander system according to claim 2 further including a closure detachably engageable with the open top of the uppermost colander of said system to cover the same for sanitary purposes.

* * * * *